United States Patent [19]
Toganoh et al.
[11] Patent Number: 4,636,805
[45] Date of Patent: Jan. 13, 1987

[54] RECORD-BEARING MEMBER AND INK-JET RECORDING METHOD BY USE THEREOF

[75] Inventors: Shigeo Toganoh; Ryuichi Arai, both of Tokyo; Mamoru Sakaki, Hiratsuka, all of Japan

[73] Assignee: Canon Kabushiki Kaisha, Tokyo, Japan

[21] Appl. No.: 711,385

[22] Filed: Mar. 13, 1985

[30] Foreign Application Priority Data

| | | | |
|---|---|---|---|
| Mar. 23, 1984 | [JP] | Japan | 59-54524 |
| Mar. 23, 1984 | [JP] | Japan | 59-54525 |
| Apr. 18, 1984 | [JP] | Japan | 59-76557 |
| May 21, 1984 | [JP] | Japan | 59-100679 |
| May 21, 1984 | [JP] | Japan | 59-100680 |
| Jun. 12, 1984 | [JP] | Japan | 59-119097 |
| Jun. 27, 1984 | [JP] | Japan | 59-130944 |
| Jul. 19, 1984 | [JP] | Japan | 59-148660 |
| Jul. 19, 1984 | [JP] | Japan | 59-148661 |

[51] Int. Cl.[4] .......... G01D 15/34; B32B 5/16
[52] U.S. Cl. .......... 346/1.1; 346/135.1; 428/210; 428/211; 428/342; 428/511
[58] Field of Search .......... 346/135.1, 1.1; 428/210, 211, 342, 511

[56] References Cited

U.S. PATENT DOCUMENTS

| | | | |
|---|---|---|---|
| 4,335,184 | 6/1982 | Miyamoto et al. | 428/342 X |
| 4,481,244 | 11/1984 | Haruta et al. | 428/155 X |
| 4,503,118 | 3/1985 | Murakami et al. | 428/323 X |
| 4,542,059 | 9/1985 | Toganoh et al. | 428/141 X |

OTHER PUBLICATIONS

IEEE Transactions on Industry Applications, vol. 1A-13, No. 1 (Feb., Mar. 1977), Nikkei Electronics, Apr. 19, 1976, pp. 48-61.
IEEE Transactions on Industry Applications, vol. 1A-13, No. 1 (Feb., Mar. 1977), Nikkei Electronics, May 6, 1974, pp. 28-37.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A record-bearing member comprises a substrate and an ink receiving layer provided on said substrate, which is capable of fixing an ink into said ink receiving layer within 3 minutes under the conditions of 20° C. and 65% RH when the ink was attached onto the surface of said ink receiving layer at a proportion of 0.7 μl per unit area ($cm^2$) of said ink receiving layer.

An ink-jet recording method performs recording through attachment of small droplets of an aqueous ink onto a record-bearing member, said record-bearing member comprising a substrate and an ink receiving layer provided on said substrate, which is capable of fixing an ink into said ink receiving layer within 3 minutes under the conditions of 20° C. and 65% RH when the ink was attached onto the surface of said ink receiving layer at a proportion of 0.7 μl per unit area ($cm^2$) of said ink receiving layer.

17 Claims, No Drawings

RECORD-BEARING MEMBER AND INK-JET RECORDING METHOD BY USE THEREOF

BACKGROUND OF THE INVENTION

1. Field of the Invention

This invention relates to a member on which recording is to be effected (hereinafter referred to as "record-bearing member") to be used when recording with an ink, particularly to a record-bearing member which is particularly excellent in light transmitting characteristics and ink fixing characteristics, and suitable for ink-jet recording, and also to ink-jet recording by use thereof.

2. Description of the Prior Art

Recording systems with the use of a recording liquid (ink) may include generally, for example, fountain pens, aqueous ball pens, felt pens, etc. and further, among recording systems attracting attention in these days, is the ink-jet recording system in which small droplets are generated by various kinds of actuating principles and attached onto a record-bearing member to effect recording thereon.

The ink-jet recording system is characterized by small generation of noise during recording and capability of high speed recording and multi-color In such a recording system, from aspects of safety and recording aptitude, aqueous inks have primarily been employed.

As the record-bearing member to be used for such a recording system, conventional papers have heretofore been employed. But the record-bearing members to be used for ink-jet recording, higher characteristics are beginning to be demanded to improve performance of the ink-jet recording device enabling high speed or multi-color recording.

Thus, for obtaining recorded images of high resolution and high quality, the record-bearing members to be used for ink-jet recording system preferably satisfy the requisite performances as shown below.

(1) To be as rapid as possible in absorption and fixing of ink.

(2) When ink dots are overlapped, the ink attached later should not flow out over the ink dot previously attached.

(3) The size of the ink dot should not be greater than is necessary.

(4) The shape of the ink dot should be an approximately true circle, and its periphery should be smooth.

(5) The density of the ink dot should be high, without obscurity around the dot.

(6) The color forming characteristics of the ink should be excellent.

Thus, recorded images by ink-jet recording have been employed for observation of surface images on one hand, while a record-bearing member is now demanded, which can utilize the recorded images by ink-jet recording for uses other than surface image observation, on the other.

The uses other than surface image observation may include those in which recorded images are projected by means of optical instruments such as slides or OHP (overhead projector) on a screen, etc. for observation, contact printer, photomask of print substrate, color separation plate during preparation of posi-plate for color printing, CMA (color mosaic filter) for color display of liquid crystal, etc.

While the diffused light of a recorded image is primarily observed when the recorded image is to be used for surface image observation, the transmitted light passing through the recorded image is primarily observed or utilized for various kinds of uses in a record-bearing member to be used in the above-mentioned uses. Accordingly, the record-bearing member to be used for these applications must be sufficient in light transmitting characteristic in addition to the performance characteristics as described above.

However, no record-bearing member has yet been known, which satisfies all of these requisite performances.

Above all, concerning record-bearing members utilizing the transmitted light through recorded images, there is no member known in the art which provides sufficiently superior recording characteristics and light transmitting characteristics at the same time. For example, when a light transmitting resin film of the prior art is used as the record-bearing member for such uses, it is inferior in ink fixing characteristic, although excellent in light transmitting characteristic, to involve drawbacks such as ink transfer when the recorded images are superposed on paper, etc. after recording or such as damaging of recorded images when touched with hands.

SUMMARY OF THE INVENTION

The present invention has been accomplished in view of such problems, and its object is to provide a record-bearing member, which satisfies sufficiently the requisite characteristics as described above, particularly with excellent ink fixing characteristic and light-transmittance, can be used for uses other than surface observation, namely uses in optical instruments utilizing transmitted light through recorded images, such as slide, OHP, contact printer, etc. and is suitable for ink-jet recording.

Another object of the present invention is to provide an ink-jet recording method in which the above record-bearing member is employed.

The above objects and other objects can be accomplished by the present invention as described below.

According to one aspect of the present invention, there is provided a record-bearing member comprising a substrate and an ink receiving layer provided on said substrate, which is capable of fixing an ink into said layer within 3 minutes under the conditions of 20° C. and 65% RH when the ink was attached onto surface of said ink receiving layer at a proportion of 0.7 $\mu$l per unit area ($cm^2$) of said ink receiving layer.

According to another aspect of the present invention, there is provided an ink-jet recording method which comprises performing recording through attachment of small droplets of an aqueous ink onto a record-bearing member, said record-bearing member comprising a substrate and an ink receiving layer provided on said substrate, which is capable of fixing an ink into said ink receiving layer within 3 minutes under the conditions of 20° C. and 65% RH when the ink was attached onto surface of said ink receiving layer at a proportion of 0.7 $\mu$l per unit area ($cm^2$) of said ink receiving layer.

DETAILED DESCRIPTION OF THE PREFERRED EMBODIMENTS

The record-bearing member of the present invention has a substrate and an ink receiving layer provided on the substrate having a surface on which recording is to be effected at the time of recording, namely the surface for receiving ink, and is characterized by excellent fixing characteristic of said ink receiving layer.

As the substrate possessed by the record-bearing member of the present invention, since the ink receiving layer possessed by the record-bearing member of the present invention has light transmitting characteristics as described hereinafter, there may be employed those which can generate effective scattered light of recorded images such as paper, cloth resins with low light transmittance when the member is to be utilized for observation of surface images; while, when it is to be employed for uses utilizing transmitted light through recorded images, there may be employed those excellent in light transmittance such as films or plates made of plastics such as polyester, diacetate, triacetate, acrylic polymer, cellophane, celluloid, polyvinyl chloride, polycarbonate, polyimide, etc., or glass plates and others.

The ink receiving layer possessed by the record-bearing member of the present invention is the portion which receives and absorbs ink from a recording means of a recording device or recording implement at the time of recording.

Generally speaking, absorption of ink with a record-bearing member is effected by penetration of ink attached on the surface of the record-bearing member into minute voids in the texture of the record-bearing member primarily through a capillary phenomenon. As the factors affecting greatly ink absorption of such a record-bearing member, there may be mentioned the structure of the record-bearing member and the physical properties of the material constituting the record-bearing member. To describe in more detail, it is important that the record-bearing member should have a structure into which ink can readily be penetrated, and the record-bearing member have an appropriate volume of voids for absorbing and housing ink, and further that the material constituting the record-bearing member should have good affinity for ink. Accordingly, since the ink employed is aqueous, it is very effective for obtaining excellent ink absorbing characteristic to use a material having hydrophilic property for the material constituting the portion of the record-bearing member which receives and absorbs ink.

The ink receiving layer possessed by the record-bearing member of the present invention can essentially be formed according to three embodiments which will now be described in detail hereinbelow. One such method of forming the ink receiving layer is according to a first embodiment with the use of a partially saponified polyvinyl alcohol, which is excellent primarily in ink absorbing characteristic and capable of forming continuous coated film having light transmitting characteristic.

The partially saponified polyvinyl alcohol to be used in the present invention can be obtained by saponifying a homopolymer of vinyl acetate or a copolymer of vinyl acetate with a vinyl monomer such as vinyl chloride, ethylene, maleic acid, itaconic acid, acrylic acid, etc. according to the known method with an acid or an alkali to a desired saponification degree.

The partially saponified polyvinyl alcohol is different in solubility in water, hydrophilic property, second order transition point temperature, etc. depending on the extent of saponification (saponification degree), and the ink absorbing characteristic of the ink absorbing layer formed of the polyvinyl alcohol will vary in correspondence to its saponification degree. Such a saponification degree should preferably be 70 to 90 mole %, more preferably 75 to 86%.

This is because a polyvinyl alcohol having a saponification degree less than 70 mole % is low in hydrophilic property to give no sufficient ink absorbing property to the ink absorbing layer formed thereof, while with a saponification degree over 90 mole %, the bonding between polymers through hydrogen bonds becomes too strong, whereby the ink absorbing property of the ink receiving layer formed of such a polyvinyl alcohol will be lowered. Further, the ink for ink-jet recording generally contains a polyhydric alcohol such as glycerine for the purpose of preventing clogging caused by evaporation of water from the ink, and too high a saponification degree will worsen undesirably affinity of such polyhydric alcohols for ink absorbing layer. Also, polyvinyl alcohol is susceptible to changes in crystal state of the polymer as well as degree of freedom in entropy of molecules, and ink absorbing property will also change with these changes. Therefore, it is preferred for obtaining good ink absorbing property within sufficiently practical range of temperature and humidity that the saponification degree of polyvinyl alcohol should be 75% to 86%.

The saponification degree as herein mentioned refers to the ratio of the vinyl acetate groups saponified relative to the total vinyl acetate groups in the polymer represented in terms of mole %.

Thus, in the record-bearing member of the present invention, affinity of the ink receiving layer itself for aqueous ink is enhanced through the hydrophilic property of the polyvinyl alcohol partially saponified preferably as the component forming the ink receiving layer, and affinity for the polyhydric alcohol contained in ink is also possessed by the unsaponified moiety, whereby penetration of ink into the ink receiving layer can easily be effected.

In the present invention, the polymerization degree of the above polyvinyl alcohol contained in the ink receiving layer is not particularly limited, but may be such that good film forming property can be obtained, namely about 300 or more.

Further, as a second embodiment, in the ink receiving layer of the present invention, it is also possible to incorporate a cation-modified product of polyvinyl alcohol (hereinafter abbreviated as PVA). The cation-modified product of PVA refers to PVA having cationic groups such as primary to tertiary amino groups or quaternary ammonium bases in the main chain or the side chain thereof. PVA is generally obtained by saponification of polyvinyl acetate according to the acid saponification method or the alkali saponification method. The cation-modified product of PVA to be used in the present invention can be obtained by copolymerizing, during polymerization of the starting material of polyvinyl acetate, a vinyl compound monomer which can readily be converted to a cationic group such as o-, m-, p-aminostyrene or monoalkyl, dialkyl derivatives thereof or quaternary ammonium salts thereof; o-, m-, p-vinylbenzylamine or monoalkyl, dialkyl derivatives thereof or quaternary ammonium salts thereof; N-(vinylbenzyl)pyrrolidine; N-(vinylbenzyl)piperidine; N-vinylpyrrolidone; α-vinylpyridine, β-vinylpyridine or quaternary ammonium salts thereof; 2-vinylquinoline, 4-vinylquinoline or quaternary ammonium salts thereof; or other nitrogen-containing heterocyclic vinyl compounds or nitro derivatives thereof with vinyl acetate, and then saponifying the copolymer obtained in a conventional manner. It is also possible to copolymerize vinyl acetate with a monomer having other reactive groups, and, after saponification, a compound containing a cationic groups are reacted with the reactive groups to effect the cationic modification of PVA.

The existing amount of the cationic groups in such a cation-modified product of PVA, as represented by the molar ratio of the monomer units in the polymer, may be 0.05 to 30 mole % of the cationic groups of the total monomer units, more preferably 0.1 to 20 mole %. If the amount of the cationic groups is less than 0.05 mole %, the properties of ink-jet recording with respect to water resistance, resolution, and color formation of the ink absorbing layer are insufficient in effect as compared with unmodified PVA, while an amount in excess of 30 mole % will result unfavorably in deterioration of adhesion of the ink absorbing layer to the substrate or film forming property. The saponification degree of the main chain polymer PVA should be selected depending on the use of the record-bearing member, but it may be preferably 85 mole % or more when used as the binding material such as fillers to be added into the ink receiving layer as described below, or preferably about 70 to 90 mole % when used as the main material of the ink receiving layer. The polymerization degree of the cation-modified product of PVA should preferably be 500 to 5,000, more preferably 800 to 3,000. Further, in either case, mixtures of polymers with different polymerization degrees and saponification degrees may be employed.

In the prior art, when an ink absorbing layer was formed of a blend of PVA in general with a cationic surfactant or a cationic polymer, due to insufficient compatibility of both components in the above blend, there were frequently caused lowering in adhesion, opacification due to insufficient compatibility, and deterioration in ink-jet recording performance during storage over a long term. In contrast, the cation-modified product of PVA to be used in the present invention, which has cationic groups in the molecular chain or the side chain, is free from the above drawbacks even when employed for formation of the ink absorbing layer as a mixture with a cationic surfactant or a cationic polymer. Further, the cation-modified PVA to be used in the present invention, because of having cationic groups in the molecular chain or the side chain, can be controlled crystallization of PVA, whereby there can be obtained the additional effects of improvement of ink absorbing property and maintenance of transparency when employed in ink absorbing layer.

As a third embodiment, the ink receiving layer of the present invention can also contain hydroxyethyl cellulose (abbreviated as HEC).

The hydroxyethyl cellulose suitable for formation of the ink receiving layer of the present invention can be obtained by addition of ethylene oxide to cellulose. Hydroxyethyl cellulose can be obtained to have various physical properties depending on the polymerization degree of glucose which is the repeating unit of cellulose and the number of moles of ethylene oxide added per one mole of glucose units, and these are different in physical properties such as solubility in water, viscosity of aqueous solution, second order transition temperature, etc. In the present invention, it is preferred to use a hydroxyethyl cellulose with a number of moles of ethylene oxide added per mole of glucose units of 1.0 to 4 moles.

This is because moles of ethylene oxide added less than 1.0 mole will give poor affinity for aqueous ink and inferior film forming property of an ink receiving layer. On the other hand, with a content in excess of 4 moles, oxyethylene groups inhibit crystallinity of the cellulose main chain to lower its film forming property, and also, when the ink receiving layer is left to stand under highly humid conditions, it will absorb moisture to cause the so called blocking phenomenon, in which films are adhered to each other.

The polymerization degree of the above hydroxyethyl cellulose to be used in formation of the ink receiving layer of the present invention is determined depending on the polymerization degree of the cellulose used as the starting material and not particularly limited. However, it may be such that good film forming property can be obtained, namely about 100 or more. Further, for improvement of solubility in water, it is also possible to employ similarly a modified hydroxyethyl cellulose such as those treated with glyoxal or modified to be cationic with a cationization agent such as 2,3-epoxypropyltrialkylammonium chloride, etc.

In the present invention, the materials as described above can be used in construction of the ink receiving layer, but they are not limitative of the present invention, but other materials may also be available. For example, there may be employed albumin, gelatin, casein, starch, cationic starch, natural resins such as gum arabic, sodium alginate, etc., synthetic resins such as polyvinyl alcohol, polyamide, polyacrylamide, polyvinyl pyrrolidone, quaternized polyvinyl pyrrolidone, polyethyleneimine, polyvinylpyrilium halide, melamine resin, polyurethane, carboxymethyl cellulose, water-soluble cellulose ether, polyester, sodium polyacrylate, SBR latex, NBR latex, polyvinylformal, polymethylmethacrylate, poly(vinyl butyral), polyacrylonitrile, poly(vinyl chloride), poly(vinyl acetate), phenolic resin, alkyd resin, etc.

The ink receiving layer of the present invention can be formed by dissolving a single or plurality of these natural or synthetic resins in a desired solvent, coating the above substrate with the resultant solution and then drying or cooling the coating.

Further, if necessary, for the purpose of primarily enhancing ink absorbability and fixing characteristic of the ink receiving layer, there may also be dispersed as filler in the above ink receiving layer at least one inorganic pigment such as fine powdery silica, clay, talc, diatomaceous earth, calcium carbonate, calcium sulfate, titanium oxide, zinc oxide, satin white, aluminum silicate, lithopone, alumina, zeolite, etc.

When the record-bearing member is to be used for uses utilizing the transmitted light through recorded images, the above filler may be employed in amounts which will not affect badly the light transmittance required for the record-bearing member.

For formation of the record-bearing member of the present invention, it is possible to apply various kinds of methods for coating of the substrate with an ink receiving layer such as the roll coater method, the blade coater method, the air knife coater method, the rod bar coater method, the hot melt coater method, etc.

The ink receiving layer possessed by the record-bearing member of the present invention thus formed is excellent particularly in ink fixing characteristic among the performances required for the record-bearing member as mentioned above.

The fixing characteristic as mentioned in the present invention refers to the ability of the ink receiving layer to absorb and retain the ink attached on the surface of the record-bearing member, namely the surface of the ink receiving layer, and the state where ink is fixed refers to the state where the ink held in the ink receiving layer is not migrated from the position at which it is held, for example, there is no transfer of ink to another paper, when the paper is superposed on the portion where ink is fixed.

The ink fixing characteristic as mentioned in the present invention can be evaluated by the time before a predetermined volume of ink attached onto a predetermined area on the surface of the ink receiving layer of the record-bearing member is fixed onto the ink receiving layer (ink fixing time). For example, evaluation may be conducted by attaching a predetermined volume of small ink droplets may onto a predetermined area of the surface of the ink receiving layer, and measuring the time until no unfixed ink is transferred onto the pressing paper, when a certain paper is pressed against the portion where said small ink droplets are attached.

More specifically, under the conditions of 20° C., 65% RH, the record-bearing material is attached with minute droplets of 85 $\mu m$ in diameter of 0.7 $\mu l/cm^2$ of ink to a number of 2180 per 1 $cm^2$, two droplets each on the same site, and an ink-jet recording paper (L paper, produced by Mitsubishi Seishi K.K.) is pressed against the attached portion under a pressure of 1 $Kg/cm^2$. The ink fixing time can be measured by measuring the time until no unfixed ink is transferred onto the pressed ink-jet recording paper.

When the ink fixing time is measured under such conditions, the ink fixing time of the record-bearing member should desirably be within 3 minutes, preferably within 2 minutes, in order to use the recorded image immediately after recording for desired uses.

For example, if the case of printing an image of A4 size is taken as the standard, the ink-jet printer currently used in practice (commercially produced) will take about 3 minutes before printing of the image of A4 size, and therefore it is desirable that the fixing time of the image should be within 3 minutes so that the recorded materials recorded successively may be layered without damaging the recorded images.

The ink receiving possessed by the record-bearing member of the present invention comprising the material as described above, as different from one which effects fixing by permitting ink to be absorbed simply through capillary phenomenon into a porous material such as paper and drying the ink, has the ability to fix ink through physical and chemical actions between the material constituting the ink receiving layer and ink such as dissolution, swelling, penetration, etc., and therefore can satisfy sufficiently the conditions for the above ink fixing time.

On the other hand, the record-bearing member of the present invention must be sufficient in light transmitting characteristic of the record-bearing member, in order to be used for uses utilizing transmitted light through the images recorded on said record-bearing member, for example, optical instruments such as slide, OHP, contact printer, etc.

For example, when the projected image of the recorded image is observed by means of OHP as a typical example of the optical instrument, it is required that the contrast between the recorded portion and the non-recorded portion should be high, and also that, in order to obtain an image which is clear and can easily be viewed, the non-recorded portion in the projected image should be light, namely the linear transmission factor through the record-bearing member should be at a level of a certain value or higher. In order to obtain the image suited for the above object from the test according to the test chart in OHP, namely in order that the lines with pitch width of 0.5 mm and thickness of 0.25 mm can clearly be discriminated from each other, the linear transmission factor of the record-bearing member is required to be 2% or more, preferably to obtain a more clear projected image, 10% or more. Accordingly, the record-bearing member suited for the objects of the present invention is essentially required to have a linear transmission factor of 2% or more.

The term "linear transmission factor [T (%)]" as mentioned in the present invention refers to the spectral transmission factor of rectilinear light, which entered a sample, transmitted through said sample, passed through the slit on the light-receiving side at a distance of at least 8 cm apart from said sample on the line elongated from the incident optical path and was received at the detector, as measured by means of, for example, Model 323 Hitachi Spectrophotometer, and further determined from the measured spectral transmission factor according to the following formula with the use of Y values of the tristimulus values of color:

$$T = Y/Y_0$$

T: linear transmission factor;
Y: Y value of sample;
$Y_0$: Y value of blank.

Thus, the linear transmission factor is relative to rectilinear light, and the method for evaluation of the light transmitting characteristic of the record-bearing member by use of linear transmission factor is different from the methods for evaluation of light transmitting characteristic by use of diffused light such as diffused transmitted light (transmittance inclusive also of diffused light is determined by providing an integrating sphere at the rear portion of the sample) or opacity (white and black backings are lined on the back of the sample, and the opacity is determined from the ratio of both cases). The problems in the instruments utilizing optical technique are caused primarily through behaviors of rectilinear light, and therefore it is particularly important to determined determine the linear transmission factor of a record-bearing member for evaluation of the light transmitting characteristic of the record-bearing member to be used for these instruments.

The record-bearing members according to the embodiments as described above have satisfactory light transmitting characteristic, being particularly excellent in ink fixing characteristic which has been inferior in the record-bearing members of the prior art such as light transmitting to enable high speed printing and multicolor printing by ink-jet recording, and therefore they are very suitable as record-bearing members for using the recorded images for uses other than surface observation, namely optical instruments utilizing the transmitted light through recorded images, such as slide, OHP, contact printer, etc.

Further, even in recording by use of a felt pen, when ink is attached continuously in broad lines with a certain width on the record-bearing member of the present invention, good absorption and fixing of ink can be obtained.

On the other hand, the ink to be used in the method of the present invention is prepared by dissolving or dispersing a dye which is basically a coloring material in a liquid medium comprising water or various kinds of organic solvents, and any one known in the art may be used. Above all, as the dye, there may preferably be employed direct dyes, acidic dyes,and basic dyes and, as the medium, water or mixtures of water with various water-soluble organic solvents may preferably be used. Examples of water-soluble organic solvents may include, for example, alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol; amides such as dimethylformamide, dimethylacetamide; ketone or ketone alcohols such as acetone, diacetone alcohol; ethers such as tetrahydrofuran, dioxane; nitrogen-containing heterocyclic ketones such as N-methyl-2-pyrrolidone, 1,3-dimethyl-2-imidazalidinone; polyalkylene glycol such as polyethylene glycol, polypropylene glycol; alkylene glycols with alkylene groups containing 2 to 6 carbon atoms such as ethylene glycol, propylene glycol, butylene glycol, triethylene glycol, 1,2,6-hexane triol, thiodiglycol, hexylene glycol, diethylene glycol; glycerine; lower alkyl ethers of polyhydric alcohols such as ethylene glycol methyl ether, diethylene glycol methyl (or ethyl) ether, triethylene glycol monomethyl (or ethyl) ether; and so on.

Among these many water-soluble organic solvents, particularly preferred are diethylene glycol which is a polyhydric alcohol and triethylene glycol monomethyl (or ethyl) ether which is a lower alkyl ether of a polyhydric alcohol.

The content of water in the ink may generally be within the range of 30 to 90% by weight based on the total weight of ink.

And, in addition, various additives known in the art may also be added for the purpose of improving the characteristics of ink.

For example, there may be employed viscosity controllers such as polyvinyl alcohol, celluloses, and water-soluble resins; various kinds of cationic, anionic or non-ionic surfactants; surface tension controllers such as diethanolamine and triethanolamine; pH controllers with the use of buffers; and others.

Also, for formulating an ink to be used in the recording method of the type wherein ink is to be charged, there may be employed specific resistivity controllers such as inorganic salts including lithium chloride, ammonium chloride, sodium chloride, etc. It is also possible to use preferably urea or thiourea as the agent for improving water retentivity at the discharging orifice tip. In the case of the type wherein ink is discharged by the action of heat energy, thermal physical property values (e.g. specific heat, coefficient of thermal expansion, thermal conductivity, etc.) may sometimes be controlled.

It is also important that the ink to be used in the method of the present invention should be contrived so that the record-bearing member is well matched to the liquid properties (viscosity, surface tension, etc.) of the ink. For example, the size of the droplets of ink tends to become smaller approximately in inverse proportion to its viscosity to make the size of printed letter dots smaller. And, such a change in printed letter characteristics also differs depending on the structure and the material of the record-bearing member, and therefore matching of the record-bearing member with the liquid properties of the ink is important.

The ink to be used in the method of the present invention may have an ink viscosity within the range not exceeding 20 cps at 25° C. in a mixture of water and various kinds of water-soluble organic solvents. If the viscosity ink exceeds 20 cps at 25° C., the fixing characteristic of ink will be lowered to take a long time before fixing of ink, whereby the recording speed is limited and also there occurs mixing of different colors when there is overlapping between inks or unnecessary expansion or disturbance of ink dots.

The ink-jet recording system to be used in the method of the present invention may be any system which permits the ink as described above to be released effectively from a nozzle and imparted to a record-bearing member as described above which is the target to be projected against, and typical systems are described in detail in, for example, IEEE Transactions on Industry Applications Vol. IA-13, No. 1 (February, March, 1977), Nikkei Electronics, Apr. 19, 1976; Jan. 29, 1973 and May 6, 1974.

To describe briefly about some of those systems, there is first the electrostatic attracting system. This system includes the method in which a strong electrical field is given a nozzle and an accellerating electrode placed several mm ahead of the nozzle to withdraw successively an ink through pulverization and information signals are given to deflecting electrodes while the ink particles withdrawn fly between the deflecting electrodes, and the method in which ink particles are not deflected but jetted in correspondence to information signals.

A second system is the ultrasonic vibration system, in which a high pressure is applied to an ink by a small pump and minute ink droplets are jetted forcibly by mechanical vibration with a quartz oscillator or the like. The ink droplets jetted are charged corresponding to information signals simultaneously with jetting. The charged ink droplets are deflected corresponding to the charged amount when passing through the deflecting electrodes.

Otherwise, there is the microdot ink-jet system utilizing this system, in which two kinds of larger and smaller ink droplets are generated by maintaining the ink pressure and vibrating conditions at adequate values and only the smaller droplets are utilized for recording. The specific feature of this system is that a group of minute droplets can be obtained even with the use of a nozzle with a thick aperture as employed in the prior art.

A third system is the piezo-element system. This system utilizes a piezo-element as the means for pressurizing an ink in place of mechanical means such as a pump as employed in other systems, and electrical signals are given to a piezo-element to create mechanical shifts thereby to apply a pressure on ink for jetting through a nozzle. Any of these various kinds of ink-jet recording systems may be available in the present invention.

The record-bearing member of the present invention is described in more detail by referring to the following Examples and Comparative examples.

EXAMPLE 1

As the substrate, a light-transmissive polyester film (produced by Teijin) with a thickness of 100 μm subjected to hydrophilic treatment was employed and an ink receiving layer was applied thereon by coating with a composition comprising 10 parts by weight of a polyvinyl alcohol (Gosenol KH-17, trade name, produced by Nippon Gosei Kagaku Kogyo K.K.) and 90 parts by weight of water according to the bar coater method to a dried film thickness of the ink receiving layer of 10 μm, followed by drying under the conditions of 70° C. and 15 minutes, to obtain a record-bearing member of the present invention which can be used for uses utilizing the transmitted light of the recorded image.

On the record-bearing member obtained, ink-jet recording was effected by means of the recording device having an on-demand type ink-jet recording head which discharged ink through a piezo-vibrator (ink discharging orifice diameter: 65 μm, piezo-vibrator driving voltage: 75 V, frequency: 2.5 KHz) with the use of inks of four colors as shown in Table 1, to obtain recorded images.

TABLE 1

| | Composition (wt. parts) | | | |
|---|---|---|---|---|
| Ink (dye) | Dye | Diethylene glycol | Polyethylene glycol #200 | Water |
| Yellow ink (C.I. Acid Yellow 23) | 2 | 20 | 15 | 65 |
| Red ink (C.I. Acid Red 92) | 2 | 20 | 15 | 65 |
| Blue ink (C.I. Acid Blue 86) | 2 | 20 | 15 | 65 |
| Black ink (C.I. Acid Black 19) | 2 | 20 | 15 | 65 |

For the recorded images, the 5 items as shown below were tested for evaluation of the aptitude for recording and the aptitude for optical instrument of the record-bearing member.

(1) Ink fixing characteristic was evaluated by measuring the time until unfixed ink was no longer transferred onto the ink-jet recording paper pressed against the ink (the ink fixing time), when the record-bearing member was attached with minute droplets of 85 82 m in diameter of 0.7 $\mu l/cm^2$ of ink to a number of 2180 per 1 $cm^2$, two droplets each on the same site, and an ink-jet recording paper (L paper, produced by Mitsubishi Seishi K.K.) was pressed against the attached portion under a pressure of 1 $Kg/cm^2$.

(2) The ink dot density was measured for black dots by means of Sakura Microdensitometer PDM-5 (produced by Konishiroku Shashin Kogyo K.K.) by applying JIS K 7650 for printed letter microdots.

(3) OHP aptitude was measured as a typical example of optical instrument aptitude of the record-bearing member and judged by observation with eyes of the recorded image which was projected on a screen by OHP, with the non-recorded portion being light and the recorded image giving a clear projected image of high OD (optical density) and high contrast being rated as O; with the non-recorded portion slightly dark and the recorded image with slightly lower OD, showing lines with pitch width of 0.5 mm and thickness of 0.25 mm which could not clearly be discriminated from each other being rated as Δ; with the non-recorded portion which is considerably dark and the recorded image showing lines with pitch width of 1 mm and thickness of 0.3 mm which could not clearly be discriminated from each other or the recorded image which could not be discriminated from the non-recorded portion being rated as X.

(4) Linear transmission factor was measured for evaluation of light transmitting characteristic as one evaluation of optical instrument aptitude, and the spectral transmittance of the rectilinear light, which entered perpendicularly said record-bearing member, passed through the slit on the light-receiving side at a distance of at least 8 cm apart from said record-bearing member on the line elongated from the incident optical path and was received at the detector, was measured by means of Model 323 Hitachi Spectrophotometer, and further Y values of the tristimulus values of color were determined from the measured spectral transmittance as calculated from the following formula:

$$T = Y/Y_0$$

T: linear transmission factor;
Y: Y value of sample;
$Y_0$: Y value of blank.

(5) The laminating characteristic of the recorded product was tasted as one evaluation of the fixing characteristic of the image, and recording was performed successively by use of record-bearing members of A4 size, and the recorded products obtained were laminated on one another successively, and the case when no disturbance of images by lamination was observed was rated as (O), while the case when disturbance of image was observed as (X).

The results of evaluations are listed in Table 3.

EXAMPLES 2-4

By using the same substrate as employed in Example 1, each of the four kinds of compositions as indicated in Table 2 was applied thereon according to the bar coater method to a dried film thickness of the ink receiving layer of 15 μm, followed by drying under the conditions of 60° C. and 20 minutes, to prepare 4 kinds of record-bearing members which can be used for uses utilizing transmitted light through the recorded image.

For each record-bearing member obtained, the same ink-jet recording with the use of four colors of inks was practiced similarly as in Example 1 to obtain a recorded image.

For the recorded image thus obtained, the tests were conducted similarly as in Example 1 for evaluation of the recording aptitude and the optical instrument aptitude of the record-bearing member. The results obtained are shown in Table 3.

TABLE 2

| Example | Components | Composition (wt. parts) |
|---|---|---|
| 2 | Polyurethane emulsion (Trade name; Aizelax S-1020 produced by Hodogaya Kagaku Kogyo K.K.) | 30 |
| | Sodium polyacrylate (Trade name; Julimer AC-10NP produced by Nippon Junyaku K.K.) | 10 |
| | Water | 70 |
| 3 | Casein | 20 |
| | Carboxy-modified styrene-butadiene latex (Trade name; JSR 0619, produced by Nippon Gosei Gomu K.K.) | 5 |
| | Polyoxyethylene octylphenol ether (Trade name; Emulgen 810 produced by Kao-Atlas K.K.) | 5 |
| | Water | 70 |
| 4 | EO, PO random adduct of bisphenol A (Trade name; Uniol DAB-800 produced by Nippon Yushi K.K.) | 20 |
| | Tolylenediisocyanate (Trade name; Sumidule T-80 produced by Sumitomo-Bayer Urethane K.K.) | 30 |

TABLE 2-continued

| Example | Components | Composition (wt. parts) |
|---|---|---|
| | Butylacetate/Toluene (1/1) | 50 |

EXAMPLE 5

By use of the same substrate as used in Example 1, a resin solution obtained by solution polymerization of the composition shown below was applied to the substrate as the ink receiving layer according to the bar coater method to a dried film thickness of the ink-receiving layer of 15 μm, followed by drying under the conditions of 60° C. and 20 minutes, to obtain a record-bearing member of the present invention which can be used for uses utilizing the transmitted light through the recorded image.

| | |
|---|---|
| 2-Acrylamide-2-methylpropane-sulfonic acid (produced by Nitto Kagaku Kogyo K.K.) | 35.0 wt. parts |
| Styrene | 5.0 wt. parts |
| Ethyl acrylate | 10.0 wt. parts |
| AIBN | 0.5 wt. parts |
| Dimethylformamide (DF) | 50.0 wt. parts |

For each record-bearing member obtained, the same ink-jet recording with the use of four colors of inks was practiced similarly as in Example 1 to obtain a recorded image.

For the recorded image thus obtained, the tests were conducted similarly as in Example 1 for evaluation of the recording aptitude and the optical instrument aptitude of the record-bearing member. The results obtained are shown in Table 3.

EXAMPLE 6

By use of the same substrate as used in Example 1, a resin solution obtained by solution polymerization of the composition shown below was applied to the substrate as the ink receiving layer according to the bar coater method to a dried film thickness of the ink-receiving layer of 15 μm, followed by drying under the conditions of 60° C. and 20 minutes, to obtain a record-bearing member of the present invention which can be used for uses utilizing the transmitted light through the recorded image.

| | |
|---|---|
| 2-Hydroxyethyl methacrylate | 40 wt. parts |
| Methyl methacrylate | 8 wt. parts |
| BPO | 0.5 wt. parts |
| Butyl acetate/methyl cellosolve (1/1) | 50.0 wt. parts |

For each record-bearing member obtained, the same ink-jet recording with the use of four colors of inks was practiced similarly as in Example 1 to obtain a recorded image.

For the recorded image thus obtained, the tests were conducted similarly as in Example 1 for evaluation of the recording aptitude and the optical instrument aptitude of the record-bearing member. The results obtained are shown in Table 3.

COMPARATIVE EXAMPLE 1

With the use of a commercially available OHP film (trade name: NP-DRY transparency, Canon Hanbai K.K.) as the record-bearing member, ink jet recording was performed similarly as in Example 1, and the recorded image obtained was evaluated for recording aptitude and optical instrument aptitude of the record-bearing member. The results obtained are shown in Table 3.

COMPARATIVE EXAMPLE 2

Four sheets of the same commercially available OHP film as used in Comparative example 1 laminated on one another were employed as the record-bearing member, and ink-jet recording was performed similarly as in Example 1, and the recorded image obtained was evaluated for recording aptitude and optical instrument aptitude of the record-bearing member. The results obtained are shown in Table 3.

TABLE 3

| | Ink fixing time | Ink dot density | OHP aptitude | Linear transmission factor | Laminating characteristic of recorded products |
|---|---|---|---|---|---|
| Example 1 | 2 min. | 0.8 | O | 80% | O |
| Example 2 | 3 min. | 0.8 | O | 70% | O |
| Example 3 | 1.5 min. | 0.7 | O | 72% | O |
| Example 4 | 1 min. | 0.6 | O | 76% | O |
| Example 5 | 1 min. | 0.7 | O | 78% | O |
| Example 6 | 2.5 min. | 0.8 | O | 76% | O |
| Comparative example 1 | one day or longer | 0.9 | O | 62% | X |
| Comparative example 2 | one day or longer | 0.8 | X | 15% | X |

EXAMPLE 7

As the substrate, a light-transmissive polyester film (produced by Teijin) with a thickness of 100 μm subjected to hydrophilic treatment was employed and an ink receiving layer was applied thereon by coating with a composition comprising 8 parts by weight of a polyvinyl alcohol partially saponified to a saponification degree of 80 mole % (PVA-420 H, produced by Kuraray K.K.) and 100 parts by weight of water according to the bar coater method to a dried film thickness of the ink receiving layer of 10 μm, followed by drying under the conditions of 80 ° C. and 10 minutes, to obtain a record-bearing member of the present invention which can be used for uses utilizing the transmitted light of the recorded image.

On the record-bearing member obtained, ink-jet recording was effected by means of the recording device having an on-demand type ink-jet recording head which discharged ink through a piezo-vibrator (ink discharging orifice diameter: 65 μm, piezo-vibrator driving voltage: 75 V, frequency: 2.5 KHz) with the use of inks of four colors as shown in Table 1, to obtain a recorded image.

For the recorded image thus obtained, the same four items as in Example 1 were tested for evaluation of the recording aptitude and the optical instrument aptitude of the record-bearing member. The results are shown in the following Table. In the overall evaluation, two kinds of evaluation were done, one (O) corresponding to being excellent in ink-jet recording aptitude, and also having sufficient light transmissive characteristic to be suited for optical instrument and the other (X) corresponding to being long in ink fixing time to be unsuitable for record-bearing member or lacking recording aptitude and optical instrument aptitude.

| Example | Ink fixing time | Ink dot density | OHP aptitude | Linear trans-mission factor | Overall evaluation |
|---|---|---|---|---|---|
| 7 | 1 min. | 1.0 | O | 82% | O |

EXAMPLE 8

As the light-transmissive substrate, a polyethylene terephthalate film with a thickness of 100 μm (produced by Toray) was employed, and a coating solution having a composition shown below was applied to the film by coating according to the bar coater method to a film thickness after drying of 15 μm, followed by drying under the conditions of 80 ° C. and 10 minutes, to obtain a light-transmissive record-bearing member of the present invention.

Coating composition:

| | |
|---|---|
| Cation-modified PVA (PVA-C-318, produced by Kuraray) | 10 parts |
| Water | 90 parts |

The record-bearing member of the present invention thus obtained was found to be colorless and transparent. For this record-bearing member, ink-jet recording was practiced by means of the recording device having an on-demand type ink-jet recording head which discharged ink through a piezo-vibrator (ink discharging orifice diameter: 60 μm, piezo-vibrator driving voltage: 70 V, frequency: 2 KHz) with the use of inks of four colors as shown below.

Yellow ink (composition)

| | |
|---|---|
| C.I. Acid Yellow 23 | 2 parts |
| Diethylene glycol | 20 parts |
| Polyethylene glycol #200 | 10 parts |
| Water | 70 parts |

Red ink (composition)

| | |
|---|---|
| C.I. Acid Red 92 | 2 parts |
| Diethylene glycol | 20 parts |
| Polyethylene glycol #200 | 10 parts |
| Water | 70 parts |

Blue ink (composition)

| | |
|---|---|
| C.I. Direct Blue 86 | 2 parts |
| Diethylene glycol | 20 parts |
| Polyethylene glycol #200 | 10 parts |
| Water | 70 parts |

Black ink (composition)

| | |
|---|---|
| C.I. Direct Black 19 | 2 parts |
| Diethylene glycol | 20 parts |
| Polyethylene glycol #200 | 10 parts |
| Water | 70 parts |

The evaluation results of the record-bearing member are shown in Table 4. The respective evaluation items were performed following the methods as described below.

(1) The ink fixing time was measured according to the method as described in detail in Example 1.

(2) The dot density was measured for black dots by means of Sakura Microdensitometer PDM-5 (produced by Konishiroku Shashin Kogyo K.K.) by applying JIS K 7505 for printed letter microdots.

(3) OHP aptitude was measured as a typical example of optical instrument aptitude of the record-bearing member and judged by observation with eyes of the recorded image which was projected on a screen by OHP, with the non-recorded portion being light and the recorded image giving a clear projected image of high OD (optical density) and high contrast being rated as O; with the non-recorded portion slightly dark and the recorded image with slightly lower OD, showing lines with pitch width of 0.5 mm and thickness of 0.25 mm which could not clearly be discriminated from each other being rated as Δ; with the non-recorded portion considerably dark and the recorded image showing lines with pitch width 1 mm and thickness of 0.3 mm which could not clearly be discriminated from each other or the recorded image which could not be discriminated from the non-recorded portion being rated as X.

(4) Linear transmission factor was determined by means of Model 323 Hitachi Spectrophotometer (produced by Hitachi Seisakusho K.K.) by maintaining the distance from the sample to the light-receiving side at about 8 cm, measuring the spectral transmittance and calculating from the above formula (1).

(5) As to the lustre, the 45° mirror surface lustre on the surface of the record-bearing member was measured based on JIS Z8741.

(6) Water resistance was evaluated by comparison of the optical density (OD) measured for the record-bearing member dipped in running water for one hour by Macbeth densitometer with the OD value before dipping.

EXAMPLE 9

As the light-transmissive substrate, the polyester film employed in Example 8 was employed and the coating solution having a composition as shown below was applied to the substrate according to the bar coater method to a dried film thickness of the ink absorbing layer of 20 μm, followed by drying by heat treatment at 60 ° C. for 20 minutes, to obtain a light-transmissive record-bearing member.

Composition of coating solution:

| | |
|---|---|
| Cationic modified PVA (PVA-C-418A, produced by Kuraray) | 10 parts |
| Water | 90 parts |

The record-bearing member thus obtained was found to be colorless and transparent.

Also for this record-bearing member, the ink-jet recording was practiced similarly as in Example 8 and the recording characteristics were evaluated similarly as in Example 8. The results are also shown in Table 4.

EXAMPLE 10

A high quality paper was used as the substrate, and the coating liquid dispersed by a sand mill having the following composition was applied to the substrate according to the bar coater method to a dried thickness of the ink absorbing layer of about 20 μm, followed by drying by heat treatment at 80° C. for 10 minutes to obtain an opaque record-bearing member.

Composition of coating liquid:

| | |
|---|---|
| Cationic modified PVA (PVA C-118AA, produced by Kuraray) | 3 parts |
| Fine powdery silica | 12 parts |
| Water | 85 parts |

The record-bearing member thus obtained was opaque, colored in white. The same ink-jet recording as in Example 8 was practiced for this record-bearing member and its recording characteristics were evaluated similarly as in Example 8. The results are shown in Table 4.

EXAMPLE 11

According to the same procedure as in Example 9 except for using an art paper, a record-bearing member was obtained. The record-bearing member obtained was opaque, colored in white. The same ink-jet recording as in Example 8 was practiced for this record-bearing member and its recording characteristics were evaluated similarly as in Example 8. The results are shown in Table 4.

COMPARATIVE EXAMPLE 3

The polyester film as used in Example 8 was used singly as the record-bearing member and the same ink-jet recording was practiced similarly as in Example 8. For this record-bearing member, the recording characteristics were evaluated similarly as in Example 8 to obtain the results as shown in Table 4.

COMPARATIVE EXAMPLE 4

The cationic modified PVA was replaced with polyvinyl alcohol PVA-117, following otherwise the same procedure as in Example 10, to obtain a record-bearing member. The record-bearing member obtained was opaque with white color. Also for this record-bearing member, the same ink-jet recording was practiced similarly as in Example 8 and its recording characteristics were evaluated similarly as in Example 8. The results are shown in Table 4.

COMPARATIVE EXAMPLE 5

Using the art paper employed in Example 8 as such as the record-bearing member, the same ink-jet recording as in Example 8 was practiced. The recording characteristics were also evaluated for this record-bearing member to obtain the results as shown in Table 4.

TABLE 4

| | Example | | | | Comparative example | | |
|---|---|---|---|---|---|---|---|
| | 8 | 9 | 10 | 11 | 3 | 4 | 5 |
| Ink fixing time | 2 min. | 2 min. | within 1 sec. | 2 min. | 7 days | within 1 sec. | 5 min. |
| Dot density | 0.4 | 0.4 | 0.7 | 0.8 | 0.4 | 0.8 | 0.5 |
| OHP apptitude | O | O | — | — | O | — | — |
| Linear trans-mission factor | 82% | 80% | — | — | 81% | — | — |
| Lustre | — | — | 8% | 72% | — | 10% | 38% |
| Water resistance | — | — | 95% | 87% | — | 23% | 16% |
| Overall evaluation | O | O | O | O | X | X | X |

EXAMPLE 12

As the substrate, a light-transmissive polyester film (produced by Teijin) with a thickness of 100 μm subjected to hydrophilic treatment was employed and a coating composition as shown below was applied as the ink absorbing layer to this film according to the bar coater method to a dried film thickness of the ink receiving layer of 15 μm, followed by drying under the conditions of 60° C. and 20 minutes, to obtain a record-bearing member of the present invention which can be used for uses utilizing the transmitted light of the recorded image.

Coating composition:

| | |
|---|---|
| Polyvinyl alcohol PVA-117 (produced by Kuraray) | 8 parts |
| Polyethylene glycol #300 | 0.8 part |
| Water | 100 parts |

The glass transition temperature of the ink absorbing layer on the record-bearing member obtained was measured as follows. That is, a polyethylene film was coated with the same coating composition and dried, followed by vacuum drying at 65° C. for 8 hours, and the film peeled off, after thorough drying under dry air, was subjected to measurement by means of a dynamic visco-elasticity measuring device RD-1 Model (produced by Ooyo Denki Kenkyusho) according to the TBA method under the conditions shown below.

Temperature elevation speed: 1° C./min.

Measuring temperature range: −10° C. -100° C.

Under environmental conditions of normal temperature and normal pressure, for the above record-bearing member, ink-jet recording was practiced by means of the recording device having an on-demand type ink-jet recording head which discharged ink through a piezo-vibrator (ink discharging orifice diameter: 65 μm, piezo-vibrator driving voltage: 75 V, frequency: 2 KHz) with the use of inks of four colors as shown below.

Yellow ink (composition)

| | |
|---|---|
| C.I. Acid Yellow 23 | 2 parts |
| Diethylene glycol | 20 parts |
| Polyethylene glycol #200 | 15 parts |
| Water | 65 parts |

Red ink (composition)

| | |
|---|---|
| C.I. Acid Red 92 | 2 parts |
| Diethylene glycol | 20 parts |
| Polyethylene glycol #200 | 15 parts |
| Water | 65 parts |

Blue ink (composition)

| | |
|---|---|
| C.I. Direct Blue 86 | 2 parts |

-continued

| | |
|---|---|
| Diethylene glycol | 20 parts |
| Polyethylene glycol #200 | 15 parts |
| Water | 65 parts |

Black ink (composition)

| | |
|---|---|
| C.I. Direct Black 19 | 2 parts |
| Diethylene glycol | 20 parts |
| Polyethylene glycol #200 | 15 parts |
| Water | 65 parts |

The recorded image thus obtained was subjected to the tests for 4 items similarly as in Example 8 to perform evaluations of the recording aptitude and the optical instrument aptitude of the record-bearing member. The evaluation results obtained are shown in Table 5.

EXAMPLE 13

As the light-transmissive substrate, the polyester film employed in Example 12 was employed and the coating solution having a composition as shown below was applied to the substrate according to the bar coater method to a dried film thickness of the ink absorbing layer of 20 μm, followed by drying by heat treatment at 80 ° C. for 10 minutes, to obtain a light-transmissive record-bearing member.

Coating composition:

| | |
|---|---|
| Polyvinyl alcohol (PVA-HC, produced by Kuraray) | 8 parts |
| Diethylene glycol | 2 parts |
| Water | 100 parts |

Also for the record-bearing member thus obtained, the ink-jet recording was practiced similarly as in Example 12 and the recording characteristics were evaluated similarly as in Example 8. The results are also shown in Table 5.

EXAMPLE 14

A light-transmissive record-bearing member was prepared according to the same procedure as in Example 12 except for using the coating composition as shown below.

Coating composition:

| | |
|---|---|
| Polyvinyl alcohol | |
| PVA-HC (produced by Kuraray) | 4 parts |
| PVA-217 produced by Kuraray) | 4 parts |
| Glycerine | 0.8 part |
| Water | 100 parts |

For the record-bearing member thus obtained, the ink-jet recording was practiced similarly as in Example 12 and the recording characteristics were evaluated similarly as in Example 8. The results are also shown in Table 5.

EXAMPLE 15

A light-transmissive record-bearing member was prepared according to the same procedure as in Example 12 except for using the coating composition as shown below.

Coating composition:

| | |
|---|---|
| Polyvinyl alcohol | 8 parts |
| PVA-405 (produced by Kuraray) | |
| Polyvinyl pyrrolidone | 0.8 part |
| Water | 100 parts |

For the record-bearing member thus obtained, the ink-jet recording was practiced similarly as in Example 12 and the recording characteristics were evaluated similarly as in Example 8. The results are also shown in Table 5.

COMPARATIVE EXAMPLE 6

Example 12 was repeated except that no polyethylene glycol #300 was added to obtain a record-bearing member for comparative purpose. For the record-bearing member, the ink-jet recording was practiced similarly as in Example 12 and the recording characteristics were evaluated similarly as in Example 8. The results are also shown in Table 5.

COMPARATIVE EXAMPLE 7

Example 14 was repeated except that no glycerine was added to obtain a record-bearing member for comparative purpose. For the record-bearing member, the ink-jet recording was practiced similarly as in Example 12 and the recording characteristics were evaluated similarly as in Example 8. The results are also shown in Table 5.

As described above and also clearly be seen from Table 5, the ink absorbing layer of the record-bearing member is formed of PVA having an appropriate glass transition temperature and being susceptible to swelling with an ink, and therefore it is particularly excellent in ink fixing characteristic among the requisite performances of the record-bearing member as shown in Examples.

TABLE 5

| | Example | | | | Comparative example | |
|---|---|---|---|---|---|---|
| | 12 | 13 | 14 | 15 | 6 | 7 |
| Glass transition temperature | 38° C. | 32° C. | 35° C. | 30° C. | 85° C. | 63° C. |
| Ink fixing time | 3 min. | 2 min. | 2 min. | 1 min. | 30 min. or longer | 20 min. |
| Linear transmission factor | 82% | 82% | 82% | 82% | 82% | 82% |
| Dot density | 1.1 | 1.1 | 1.1 | 1.0 | 1.2 | 1.2 |
| OHP aptitude | O | O | O | O | O | O |
| Overall evaluation | O | O | O | O | X | X |

EXAMPLE 16

As the substrate, a light-transmissive polyester film (produced by ICI) with a thickness of 100 μm was employed and a coating solution as shown below was applied to this film according to the bar coater method to a dried film thickness of the ink receiving layer of 6 μm, followed by drying by heat treatment under the conditions of 80 ° C. and 20 minutes, to obtain a record-bearing member of the present invention which can be used for uses utilizing the transmitted light of the recorded image.

Composition of coating solution:

| | |
|---|---|
| Hydroxymethyl cellulose (Fuji HEC AH-15, produced by Fuji Chemical) | 5 parts |
| Water | 95 parts |

For the above record-bearing member, ink-jet recording was practiced by means of the recording device having an on-demand type ink-jet recording head which discharged ink through a piezo-vibrator (ink discharging orifice diameter: 60 μm, piezo-vibrator driving voltage: 65 V, frequency: 2 KHz) with the use of four kinds of inks as shown below.

Yellow ink (composition)

| | |
|---|---|
| C.I. Acid Yellow 23 | 2 parts |
| Diethylene glycol | 15 parts |
| Polyethylene glycol #200 | 10 parts |
| Water | 75 parts |

Red ink (composition)

| | |
|---|---|
| C.I. Acid Red 37 | 2 parts |
| Diethylene glycol | 15 parts |
| Polyethylene glycol #200 | 10 parts |
| Water | 75 parts |

Blue ink (composition)

| | |
|---|---|
| C.I. Direct Blue 86 | 2 parts |
| Diethylene glycol | 15 parts |
| Polyethylene glycol #200 | 10 parts |
| Water | 75 parts |

Black ink (composition)

| | |
|---|---|
| C.I. Direct Black 19 | 2 parts |
| Diethylene glycol | 15 parts |
| Polyethylene glycol #200 | 10 parts |
| Water | 75 parts |

The recording characteristic of the record-bearing member of the present invention obtained in this Example and the image characteristics of the printing recorded were evaluated to obtain the results as shown in Table 6. Measurements of the respective evaluation items were conducted following the same methods as in Example 8.

COMPARATIVE EXAMPLE 8

The same ink-jet recording as in Example 16 was practiced by use of a triacetate film (produced by Fuji Photo Film) with a thickness of 100 μm.

The results of the recording characteristic of the record-bearing member of this comparative example and the image characteristics of the printing recorded are also listed in Table 6.

EXAMPLE 17

As the light-transmissive substrate, a polyethylene terephthalate film (produced by ICI) with a thickness of 75 μm was employed and a coating solution as shown below was applied to this film according to the bar coater method to a dried film thickness of 10 μm, followed by drying by heat treatment under the conditions of 60 ° C. and 20 minutes. Composition of coating solution:

| | |
|---|---|
| Hydroxyethyl cellulose (Fuji HEC A-5-25 CF, produced by Fuji Chemical) | 2 parts |
| Water | 98 parts |

Also for the record-bearing member, the inkjet recording was practiced similarly as in Example 16 and the recording characteristics and the image characteristics of the recorded printing were evaluated similarly as in Example 8. The results are also shown in Table 6.

COMPARATIVE EXAMPLE 9

Ink-jet recording was practiced in the same manner as in Example 16 except that a commercially available tracing paper (thickness: about 80 μm) was employed as the record-bearing member. The recording characteristics and the image characteristics of the recorded printing were evaluated similarly as in Example 8 to obtain the results shown in Table 6.

TABLE 6

| | Example | | Comparative example | |
|---|---|---|---|---|
| | 16 | 17 | 8 | 9 |
| Ink fixing time | 30 sec. | 45 sec. | 4 days | 1 day |
| Linear transmission factor | 84% | 82% | 78% | 1% |
| Dot density | 1.0 | 1.1 | 1.0 | 0.6 |
| OHP aptitude | O | O | O | X |
| Overall evaluation | O | O | X | X |

EXAMPLE 18

As the light-transmissive substrate, a polyethylene terephthalate film with a thickness of 100 μm (produced by Toray) was employed, and a coating solution having a composition shown below was applied to the film by coating according to the bar coater method to a film thickness after drying of 8 μm, followed by drying under the conditions of 80 ° C. and 10 minutes, to obtain a light-transmissive record-bearing member of the present invention.

Coating composition:

| | |
|---|---|
| Cation-modified PVA (PVA-C-318AA, produced by Kuraray) | 10 parts |
| Water | 90 parts |

For this record-bearing member, ink-jet recording was practiced by means of the recording device having an on-demand type ink-jet recording head which discharged ink through a piezo-vibrator (ink discharging orifice diameter: 60 μm, piezo-vibrator driving voltage: 70 V, frequency: 2 KHz) with the use of four kinds of inks as shown below.

Yellow ink (10 cp)

| | |
|---|---|
| C.I. Acid Yellow 86 | 2 parts |

-continued

| | |
|---|---|
| Polyethylene glycol #600 | 45 parts |
| Water | 55 parts |

Red ink (20 cp)

| | |
|---|---|
| C.I. Acid Red 35 | 2 parts |
| Methyl cellulose (trade name: Metlose 90SH-100, produced by Shinetsu Kagaku K.K.) | 0.28 part |
| Polyethylene glycol #600 | 45 parts |
| Water | 55 parts |

Blue ink (5.0 cp)

| | |
|---|---|
| C.I. Direct Blue 86 | 2 parts |
| Triethylene glycol monomethyl ether | 50 parts |
| Water | 50 parts |

Black ink (composition)

| | |
|---|---|
| C.I. Food Black 2 | 2 parts |
| Diethylene glycol | 30 parts |
| Water | 70 parts |

The evaluation results of the recording aptitude of the record-bearing member are shown in Table 7. The respective evaluation items were performed following the methods as described below.

(1) The ink fixing time was measured according to the method as described in detail in Example 1.

(2) The dot density was measured for black dots by means of Sakura Microdensitometer PDM-5 (produced by Konishiroku Shashin Kogyo K.K.) by applying JIS K 7505 for printed letter microdots.

(3) OHP aptitude was measured as a typical example of optical instrument aptitude of the record-bearing member and judged by observation with eyes of the recorded image which was projected on a screen by OHP, with the non-recorded portion being light and the recorded image giving a clean projected image of high OD (optical density) and high contrast being rated as O; with the non-recorded portion slightly dark and the recorded image with slightly lower OD, showing lines with pitch width of 0.5 mm and thickness of 0.25 mm which could not clearly be discriminated from each other being rated as Δ; with the non-recorded portion considerably dark and the recorded image showing lines with pitch width of 1 mm and thickness of 0.3 mm which could not clearly be discriminated from each other or the recorded image which could not be discriminated from the non-recorded portion being rated as X.

(4) Linear transmission factor was determined by means of Model 323 Hitachi Spectrophotometer (produced by Hitachi Seisakusho K.K.) by maintaining the distance from the sample to the light-receiving side at about 8 cm, measuring the spectral transmittance and calculating from the above formula (1).

(5) As to the lustre, the 45° mirror surface lustre on the surface of the record-bearing member was measured based on JIS Z8741.

(6) Water resistance was evaluated by comparison of the optical density (OD) measured for the record-bearing member dipped in running water for one hour by Macbeth densitometer with the OD value before dipping.

(7) Light fastness was measured by the color difference between the image irradiated by means of a Xenon Fadometer FAL-25AX-HC Model (produced by Suga Shikenki) for 100 hours and the unirradiated one, as measured by NP-1001DP (produced by Nippon Denshoku).

EXAMPLE 19

As the light-transmissive substrate, the polyester film employed in Example 18 was employed and the coating solution having a composition as shown below was applied to the substrate according to the bar coater method to a dried film thickness of the ink absorbing layer of 10 μm, followed by drying by heat treatment at 60 ° C. for 20 minutes, to obtain a colorless and transparent light-transmissive record-bearing member.

Composition of coating solution:

| | |
|---|---|
| Cation-modified PVA (PVA-C-418A, produced by Kuraray) | 10 parts |
| Water | 90 parts |

Also for this record-bearing member, the ink-jet recording was practiced similarly as in Example 18 and the recording characteristics were evaluated similarly as in Example 18. The results are also shown in Table 7.

EXAMPLE 20

A high quality paper was used as the substrate, and the coating liquid dispersed by a sand mill having the following composition was applied to the substrate according to the bar coater method to a dried thickness of the ink absorbing layer of about 20 μm, followed by drying by heat treatment at 80 ° C. for 10 minutes to obtain a white opaque record-bearing member.

Composition of coating liquid:

| | |
|---|---|
| Cation-modified PVA (PVA C-118AA, produced by Kuraray) | 3 parts |
| Fine powdery silica | 12 parts |
| Water | 85 parts |

The same ink-jet recording as in Example 18 was practiced for this record-bearing member and its recording characteristics were evaluated similarly as in Example 18. The results are shown in Table 7.

EXAMPLE 21

According to the same procedure as in Example 19 except for using an art paper, a record-bearing member was obtained. The record-bearing member obtained was opaque, colored in white. The same ink-jet recording as in Example 18 was practiced for this record-bearing member and its recording characteristics were evaluated similarly as in Example 18. The results are shown in Table 7.

EXAMPLE 22

A commercially available paper for ink-jet (Paper L for IJ, produced by Mitsubishi Seishi) was impregnated by size press with a cation-modified PVA (PVA C-118AA, produced by Kuraray) at a proportion of 0.5 g/$m^2$ to obtain a record-bearing member. The same ink-jet recording as in Example 18 was practiced for this record-bearing member and its recording characteristics were evaluated similarly as in Example 18. The results are shown in Table 7.

TABLE 7

| | Example | | | | |
|---|---|---|---|---|---|
| | 18 | 19 | 20 | 21 | 22 |
| Ink fixing time | 45 sec. | 1 min. | within 1 sec. | 1 min. | within 1 sec. |
| Dot density | 1.0 | 1.0 | 0.9 | 1.1 | 0.6 |
| OHP aptitude | O | O | — | — | — |
| Linear transmission factor | 78% | 80% | — | — | — |
| Lustre | — | — | 6% | 62% | 5% |
| Water resistance | | | | | |
| (Y) | — | — | 97% | — | 98% |
| (M) | — | — | 72% | — | 68% |
| (C) | — | — | 100% | — | 98% |
| (BK) | — | — | 86% | — | 92% |
| Light fastness | | | | | |
| (Y) ΔE | 0.5 | 0.7 | 0.9 | 0.6 | 0.4 |
| (M) | 3.5 | 3.8 | 5.8 | 3.4 | 3.0 |
| (C) | 1.8 | 1.5 | 3.7 | 1.7 | 1.4 |
| (BK) | 2.7 | 2.4 | 4.4 | 2.6 | 2.0 |
| Overall evaluation | O | O | O | O | O |

What is claimed is:

1. A record-bearing member having a linear transmission factor of at least 2%, comprising a substrate and an ink receiving layer provided on said substrate, said ink receiving layer consisting essentially of a material selected from the group, consisting of a partially saponified polyvinyl alcohol with a saponification degree of at least about 70 mole %, a cation-modified product of polyvinyl alcohol and hydroxyethylcellulose applied to said substrate in a solvent, said ink receiving layer being capable of fixing ink within 3 minutes at 20° C. and 65% RH when the ink is deposited onto the surface of said ink receiving layer at a proportion of about 0.7 μl per unit area ($cm^2$) of said ink receiving layer.

2. The record-bearing member according to claim 1, wherein said substrate is substantially transparent.

3. The record-bearing member according to claim 1, wherein said substrate is plastic or glass.

4. The record-bearing member according to claim 1, wherein said partially saponified polyvinyl alcohol or cation-modified product of polyvinyl alcohol is derived from a homopolymer of vinyl acetate.

5. The record-bearing member according to claim 1 wherein said partially saponified polyvinyl alcohol or cation-modified product of polyvinyl alcohol is derived from a copolymer of vinyl chloride with a vinyl monomer.

6. The record-bearing member according to claim 5, wherein said vinyl monomer is selected from the group consisting of: vinyl chloride, ethylene, maleic acid, itaconic acid and acarylic acid, or combinations thereof.

7. The record-bearing member according to claim 1, wherein the degree of saponfication of the partially saponified polyvinyl alcohol is between about 75–86 mole %.

8. The record-bearing member according to claim 1, wherein said cation-modified product of polyvinyl alcohol includes primary, secondary, or tertiary amino groups, quarternary ammonium groups, or combinations thereof.

9. The record-bearing member according to claim 8, wherein said cationic groups are present between about 0.1–20 mole % of cationic groups of total monomer units.

10. The record-bearing member according to claim 1, wherein said linear transmission factor is at least 10%.

11. An ink-jet recording method for recording through depositing small droplets of an aqueous ink onto a record-bearing member having a linear transmission factor of at least 2%, said record-bearing member comprising a substrate and an ink receiving layer provided on said substrate, said ink receiving layer consisting essentially of a material selected from the group consisting of a partially saponified polyvinyl alcohol with a saponification degree of at least about 70 mole %, a cation-modified product of polyvinyl alcohol and hydroxyethylcellulose applied to said substrate in a solvent, said ink receiving layer being capable of fixing ink within 3 minutes at 20° C. and 65% RH when the ink is deposited onto the surface of said ink receiving layer at a proportion of about 0.7 μl per unit area ($cm^2$) of said ink receiving layer.

12. An ink-jet recording method according to claim 11, wherein the aqueous ink contains water in an amount within the range of from 30 to 90% based on the total weight of ink.

13. An ink-jet recording method according to claim 11, wherein the aqueous ink has a viscosity at 25° C. of 20 cps or lower.

14. An ink-jet recording method according to claim 11, wherein plural kinds of color inks are used as the aqueous ink.

15. The ink jet recording method according to claim 11, wherein the substrate is plastic or glass.

16. The ink jet recording method according to claim 11, wherein said aqueous ink includes a water-soluble organic solvent.

17. The ink jet recording method according to claim 16, wherein said water-soluble organic solvent is selected, from the group consisting of: alkyl alcohols having from 1 to 4 carbons, amides, ketones, ketone alcohols, ethers, nitrogen-containing heterocyclic ketones, polyalkylene glycols, alkylene glycols with alkylene groups having from 2 to 6 carbons, glycerine and lower alkyl ethers of polyhydric alcohols.

* * * * *